United States Patent Office 3,015,641
Patented Jan. 2, 1962

3,015,641
METHOD OF INCREASING PARTICLE SIZE IN SYNTHETIC RUBBER LATEX BY TREATMENT WITH VOLATILE SALT AND POLYETHYLENE POLYAMINE
Carl V. Bawn, Naugatuck, and Byron A. Hunter, Woodbridge, Conn., assignors to United States Rubber Company, New York, N.Y., a corporation of New Jersey
No Drawing. Filed Mar. 16, 1960, Ser. No. 15,253
12 Claims. (Cl. 260—29.7)

This invention relates to increasing the particle size of synthetic rubber latices, and particularly to permit them to be concentrated to fluid latices of high solids content.

The use of electrolytes to cause an increase in the particle size of synthetic rubber latices is well known. The addition to a synthetic rubber latex of a volatile electrolyte that can be removed from the latex by distillation to increase the particle size of the latex is known as shown in John S. Rumbold U.S. Patent No. 2,475,053, dated July 5, 1949.

We have found that the increase in the particle size of a synthetic rubber latex by the addition of a volatile electrolyte is much greater if polyethylene polyamine is also added to the latex. Latices to which such volatile electrolyte and polyalkylene polyamine have been added may readily be concentrated, preferably by evaporation concentration, to fluid high solids latices.

In carrying out the present invention, there is added to a synthetic rubber latex 2% to 15% of volatile electrolyte and also 0.03% to 1% of polyethylene polyamine, based on the weight of the solids of the latex. The volatile electrolyte may be any ammonium or substituted ammonium (amine) salt that can be volatilized from aqueous solution, e.g. at temperatures up to 100° C., as shown in the John S. Rumbold U.S. Patent No. 2,475,053, dated July 5, 1949. Examples of such volatile electrolytes that may be used in the present invention are ammonium carbonate, ammonium bicarbonate, ammonium formate, ammonium nitrite, dimethyl ammonium carbonate, diethyl ammonium carbonate, morpholine carbonate, dimethyl ammonium formate. The preferred volatile electrolytes, are the ammonium salts of carbonic acid, viz ammonium bicarbonate and ammonium carbonate. After the increase in particle size by addition of the volatile electrolyte and polyethylene polyamine, the volatile electrolyte may be removed from the latex as by steam distillation. The latex will conventionally have a solids content of 20% to 50%, and after the addition of the volatile salt electrolyte and the polyethylene polyamine, the latex may readily be concentrated to a solids content of 55% to 70%, giving a fluid high solids latex. The latex may be concentrated by increasing the solids content in known manner as by creaming with a vegetable mucilage, such as ammonium alginate. It is preferred, however, to increase the solids content by evaporation concentration, and if the volatile electrolyte has not been previously removed from the latex as by steam distillation, it will be volatilized during the evaporation concentration. The temperature of treatment of the latex according to the present invention will generally be in the range from 0° C. to 100° C. The average particle diameter of latices to be treated according to the present invention may be from 500 to 1500 Angstrom units, and the average particle diameter of these latices may be increased by 200 to 2500 Angstrom units by the process of the present invention.

The polyethylene polyamines that may be used in the present invention are well known materials which are reaction products of ethylene dichloride and ammonia. One or a mixture of polyethylene polyamines may be used. Examples are diethylene triamine, triethylene tetramine, tetraethylene pentamine, pentaethylene hexamine, hexaethylene heptamine, heptaethylene octamine and higher polyethylene polyamines as in the still bottom from the distillation recovery of the lower polyethylene polyamines. Commercial Polyamine H is a distillate of a mixture of pentaethylene hexamine and higher polyamines with some minor amounts of lower polyamines. Commercial Polyamine T is a still residue from the distillation of Polyamine H.

The synthetic rubber latex may be an aqueous emulsion polymerizate of one or more butadienes-1,3, for example, butadiene-1,3, 2-methylbutadiene-1,3 (isoprene), 2,3-dimethyl-butadiene-1,3, piperylene, or a mixture of one or more such butadienes-1,3 with one or more other polymerizable compounds which are capable of forming rubbery copolymers with butadienes-1,3, for example, up to 70% by weight of such mixture of one or more monoethylenic compounds which contain a $CH_2=C<$ group where at least one of the disconnected valences is attached to an electro-negative group, that is, a group which substantially increases the electrical dissymmetry or polar character of the molecule. Examples of compounds which contain a $CH_2=C<$ group and are copolymerizable with butadienes-1,3 are aryl olefines, such as styrene, vinyl toluene, alpha methyl styrene, chlorostyrene, dichloro-styrene, vinyl naphthalene; the alpha methylene carboxylic acids and their esters, nitriles and amides, such as acrylic acid, methyl acrylate, methyl methacrylate, acrylonitrile, methacrylonitrile, methacrylamide; vinyl pyridines, such as 2-vinyl pyridine, 2-methyl-5-vinyl pyridine; methyl vinyl ketone; vinylidene chloride. Such a synthetic rubber latex may be termed a "butadiene polymer synthetic rubber latex." The latices will contain dispersing agents from the polymerization generally in amount from 2% to 10% by weight of the solids of the latex of one or a mixture of anionic surface-active dispersing agents. Such anionic surface-active dispersing agents may be water-soluble soaps of soap-forming monocarboxylic acids, such as alkali-metal, ammonium or amine salts of higher fatty acids having 10 to 24 carbon atoms in the molecule or of rosin acids, including hydrogenated, dehydrogenated and disproportionated rosin acids. The anionic surface-active dispersing agents may be sulfonated or sulfated compounds having the general formula $R-SO_3M$ or $R-OSO_3M$, where M represents alkali-metal, ammonium or amine radical, and R represents an organic radical containing a group having 9 to 23 carbon atoms, such as alkyl sulfonates, e.g. dodecyl sodium sulfonate; alkyl sulfates, e.g. sodium oleyl sulfate; alkyl aryl sulfonates, e.g. dodecyl benzene sulfonate; alkyl sulfosuccinates, e.g. dioctyl sodium sulfosuccinate; aryl sulfonate-formaldehyde condensation products, e.g. condensation product of sodium naphthalene sulfonate and formaldehyde. Additional such anionic surface-active dispersing agents in amount up to 3% of the solids of the latex, may be added to the latex before increasing the particle size according to the present invention to assure stability to the latex on particle size enlargement, and on concentrating the latex.

The following examples illustrate the invention. All parts and percentages referred to herein are by weight.

The latices used in Examples 1 to 3 were prepared by polymerizing at 41° F. to approximately 80 percent conversion of monomers to polymer, various batches of the following recipe: 70 parts of butadiene-1,3; 30 parts of styrene; 3 parts of potassium oleate; 0.5 part of potassium sulfate; 0.5 part of a condensation product of sodium naphthalene sulfonate and formaldehyde dispersing agent; 0.1 part of mixed tertiary alkyl ($C_{12}$ to $C_{16}$) mercaptans;

0.1 part of diisopropyl benzene hydroperoxide; 0.0025 part of ferrous sulfate heptahydrate; 0.0038 part of the tetrasodium salt of ethylene diamine tetraacetic acid, 0.1 part of sodium formaldehyde sulfoxylate; and 150 parts of water. After polymerization to approximately 80% conversion, unreacted butadiene was vented off and unreacted styrene was removed by steam distillation.

*Example 1*

The latex used in this example had 34.5% solids content, a pH of 9.7, and an average particle diameter of about 600 Angstrom units. To each of four samples A, B, C and D of the latex was added a solution containing 1.5 parts of a condensation product of sodium naphthalene sulfonate and formaldehyde dispersing agent and 5 parts of ammonium bicarbonate per 100 parts of latex solids. To samples A, B, and C were added 0.2 part per 100 parts of latex solids of tetraethylene pentamine, Polyamine H and Polyamine T, respectively, as 10% aqueous solutions. No polyethylene polyamine was added to the control sample D. After standing for 30 minutes the latex was concentrated by evaporation concentration in a laboratory disc concentrator. The solids content of the concentrated latices A, B, C and D were 57.9%, 58.5%, 59.7% and 56.2%, respectively. The average particle diameters of the concentrated latices A, B, C and D were 1540, 1770, 1620 and 1320 Angstrom units, respectively, showing the increase in particle size enlargement in the presence of the volatile electrolyte and the polyethylene polyamine.

The much greater increase in particle size on addition of the volatile electrolyte and the polyethylene polyamines in latices A, B and C over the increase in particle size in latex D which resulted from the known incorporation of the ammonium bicarbonate is clearly a synergistic effect since polyethylene polyamines alone do not increase the particle size of synthetic rubber latices as shown in Example 4 below.

*Example 2*

That the particle size is increased on addition of the volatile electrolyte with some further increase on standing, and that the concentrating of the latex of enlarged particle size according to the present invention does not further increase the particle size is shown as follows: The latex used in this example had a pH of 10.3 and an average particle diameter of 700 Angstrom units. There was added to the latex 1.5 parts of a condensation product of sodium naphthalene sulfonate and formaldehyde dispersing agent as a 20% aqueous solution and 0.2 part of Polyamine T as a 10% aqueous solution, per 100 parts of latex solids. Five parts per 100 parts of latex solids of ammonium bicarbonate was added, whereupon the pH dropped to 8.3 and the average particle diameter increased to about 1205 Angstrom units. After standing ½ hour, the pH remained at 8.3 and the average particle diameter had further increased to 1920 Angstrom units. The added ammonium bicarbonate was volatilized by steam distillation and the latex was concentrated to 69.9% solids concentration in a laboratory disc concentrator. The average particle diameter of the concentrated latex was 1920 Angstrom units.

*Example 3*

A sample of the latex of Example 2 was treated similarly to Example 2 except that diethylamine carbonate was used instead of ammonium bicarbonate as the added volatile electrolyte. The final concentrated latex had an average particle diameter of 1730 Angstrom units.

*Example 4*

This example shows that polyethylene polyamines alone do not increase the particle size of synthetic rubber latices.

A latex was prepared by polymerizing at 41° F. to approximately 80% conversion, the following recipe: 72 parts of butadiene, 28 parts of styrene, 2.75 parts of potassium oleate, 1.75 parts of potassium salt of disproportionated rosin acids, 0.5 part of potassium sulfate, 0.5 part of a condensation product of sodium naphthalene sulfonate and formaldehyde dispersing agent, 0.09 part of mixed tertiary alkyl ($C_{12}$ to $C_{16}$) mercaptans, 0.1 part of diisopropyl benzene hydroperoxide, 0.011 part of ferrous sulfate heptahydrate, 0.044 part of the tetra sodium salt of ethylene diamine tetraacetic acid, 0.12 part of sodium formaldehyde sulfoxylate, 0.03 part of sodium hydrosulfite, and 155 parts of water. After polymerization to approximately 80% conversion, it was shortstopped with 0.2 part of potassium dimethyl dithiocarbamate. Unreacted butadiene was vented off and unreacted styrene was removed by steam distillation. The finished latex had a total solids content of 36.3% and a particle size of 820 Angstrom units.

To each of five samples I, II, III, IV and V of the latex was added 1.14 per 100 parts of latex solids of a condensation product of sodium naphthalene sulfonate and formaldehyde dispersing agent as a 10% aqueous solution. To sample II of the latex was also added 0.15 part of tetraethylene pentamine as a 10% aqueous solution. To sample III of the latex was also added 0.76 part of tetraethylene pentamine as a 10% aqueous solution. To sample IV of the latex was also added 0.76 part of diethylene triamine as a 10% aqueous solution. To sample V of the latex was also added 7.6 parts of tetraethylene pentamine as a 10% aqueous solution. To sample VI of the latex was added 11.5 parts per 100 parts of latex solids of a condensation product of sodium naphthalene sulfonate and formaldehyde dispersing agent as a 10% solution and 10.0 parts of tetraethylene pentamine as a 10% solution. The parts of polyethylene polyamines added to the latex are parts by weight per 100 parts of solids of the latex. No polyethylene polyamine was added to sample I of the latex.

Each of the thus treated latex samples was allowed to stand for at least 30 minutes after which the particle sizes were determined. The average particle diameter of sample I to which no polyethylene polyamine had been added was 820 Angstrom units, whereas the average particle diameters of samples II, III, IV, V and VI to which polyethylene polyamines had been added were 800, 820, 810, 830 and 840 Angstrom units, respectively, showing that the polyethylene polyamines alone, i.e. in the absence of added volatile electrolyte, do not increase the particle size of synthetic rubber latices.

The latices of increased particle size according to the present invention, particularly of high solids content, may be used in the usual applications of latices, as in foam sponge manufacture, tire cord dipping, bonding and impregnating various materials, preparation of adhesives, and the like.

This application is a continuation-in-part of our application Serial No. 776,757, filed November 28, 1958, now abandoned.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. The method of increasing the size of the dispersed polymer particles in a synthetic rubber latex aqueous emulsion polymerizate of material selected from the group consisting of butadienes-1,3 and mixtures of butadienes-1,3 with up to 70% by weight of such mixtures of mono-ethylenic compounds which contain a $CH_2=C<$ group and are copolymerizable with butadienes-1,3 which comprises adding to the latex 2% to 15% of a volatile electrolyte selected from the group consisting of ammonium and amine salts that can be volatilized from aqueous solution at temperatures up to 100° C. and 0.03% to 1% of polyethylene polyamine selected from the group consisting of diethylene triamine, triethylene tetramine, tetraethylene pentamine, pentaethylene hexamine, hexaethylene heptamine, heptaethylene octamine and higher polyethylene polyamines from the still bottom from the distillation recovery of the lower polyethylene polyamines from the product of the reaction of ethylene dichloride and ammonia, said percentages being based on the weight of the solids of the latex.

2. The method of increasing the size of the dispersed polymer particles in a synthetic rubber latex aqueous emulsion polymerizate of material selected from the group consisting of butadienes-1,3 and mixtures of butadienes-1,3 with up to 70% by weight of such mixtures of monoethylenic compounds which contain a $CH_2=C<$ group and are copolymerizable with butadienes-1,3 which comprises adding to the latex 2% to 15% of an ammonium salt of carbonic acid and 0.03% to 1% of polyethylene polyamine selected from the group consisting of diethylene triamine, triethylene tetramine, tetraethylene pentamine, pentaethylene hexamine, hexaethylene heptamine, heptaethylene octamine and higher polyethylene polyamines from the still bottom from the distillation recovery of the lower polyethylene polyamines from the product of the reaction of ethylene dichloride and ammonia, said percentages being based on the weight of the solids of the latex.

3. The method of increasing the size of the dispersed polymer particles in a synthetic rubber latex aqueous emulsion polymerizate of material selected from the group consisting of butadienes-1,3 and mixtures of butadienes-1,3 with up to 70% by weight of such mixtures of monoethylenic compounds which contain a $CH_2=C<$ group and are copolymerizable with butadienes-1,3 which comprises adding to the latex 2% to 15% of ammonium bicarbonate and 0.03% to 1% of polyethylene polyamine selected from the group consisting of diethylene triamine, triethylene tetramine, tetraethylene pentamine, pentaethylene hexamine, hexaethylene heptamine, heptaethylene octamine and higher polyethylene polyamines from the still bottom from the distillation recovery of the lower polyethylene polyamines from the product of the reaction of ethylene dichloride and ammonia, said percentages being based on the weight of the solids of the latex.

4. The method of increasing the size of the dispersed polymer particles in a synthetic rubber latex of a copolymer of butadiene-1,3 and styrene which comprises adding to the latex 2% to 15% of a volatile electrolyte selected from the group consisting of ammonium and amine salts that can be volatilized from aqueous solution at temperatures up to 100° C. and 0.03% to 1% of polyethylene polyamine selected from the group consisting of diethylene triamine, triethylene tetramine, tetraethylene pentamine, pentaethylene hexamine, hexaethylene heptamine, heptaethylene octamine and higher polyethylene polyamines from the still bottom from the distillation recovery of the lower polyethylene polyamines from the product of the reaction of ethylene dichloride and ammonia, said percentages being based on the weight of the solids of the latex.

5. The method of increasing the size of the dispersed polymer particles in a synthetic rubber latex of a copolymer of butadiene-1,3 and styrene which comprises adding to the latex 2% to 15% of an ammonium salt of carbonic acid and 0.03% to 1% of polyethylene polyamine selected from the group consisting of diethylene triamine, triethylene tetramine, tetraethylene pentamine, pentaethylene hexamine, hexaethylene heptamine, heptaethylene octamine and higher polyethylene polyamines from the still bottom from the distillation recovery of the lower polyethylene polyamines from the product of the reaction of ethylene dichloride and ammonia, said percentages being based on the weight of the solids of the latex.

6. The method of increasing the size of the dispersed polymer particles in a synthetic rubber latex of a copolymer of butadiene-1,3 and styrene which comprises adding to the latex 2% to 15% of ammonium bicarbonate and 0.03% to 1% of polyethylene polyamine selected from the group consisting of diethylene triamine, triethylene tetramine, tetraethylene pentamine, pentaethylene hexamine, hexaethylene heptamine, heptaethylene octamine and higher polyethylene polyamines from the still bottom from the distillation recovery of the lower polyethylene polyamines from the product of the reaction of ethylene dichloride and ammonia, said percentages being based on the weight of the solids of the latex.

7. The method of concentrating a synthetic rubber latex aqueous emulsion polymerizate of material selected from the group consisting of butadienes-1,3 and mixtures of butadienes-1,3 with up to 70% by weight of such mixtures of monoethylenic compounds which contain a $CH_2=C<$ group and are copolymerizable with butadienes-1,3 having a solids content of 20% to 50% which comprises adding to the latex 2% to 15% of a volatile electrolyte selected from the group consisting of ammonium and amine salts that can be volatilized from aqueous solution at temperatures up to 100° C. and 0.03% to 1% of polyethylene polyamine selected from the group consisting of diethylene triamine, triethylene tetramine, tetraethylene pentamine, pentaethylene hexamine, hexaethylene heptamine, heptaethylene octamine and higher polyethylene polyamines from the still bottom from the distillation recovery of the lower polyethylene polyamines from the product of the reaction of ethylene dichloride and ammonia, said percentages being based on the weight of the solids of the latex, and then increasing the solids content of the latex to within the range of 55% to 70%.

8. The method of concentrating a synthetic rubber latex aqueous emulsion polymerizate of material selected from the group consisting of butadienes-1,3 and mixtures of butadienes-1,3 with up to 70% by weight of such mixtures of monoethylenic compounds which contain a $CH_2=C<$ group and are copolymerizable with butadienes-1,3 having a solids content of 20% to 50% which comprises adding to the latex 2% to 15% of an ammonium salt of carbonic acid and 0.03% to 1% of polyethylene polyamine selected from the group consisting of diethylene triamine, triethylene tetramine, tetraethylene pentamine, pentaethylene hexamine, hexaethylene heptamine, heptaethylene octamine and higher polyethylene polyamines from the still bottom from the distillation recovery of the lower polyethylene polyamines from the product of the reaction of ethylene dichloride and ammonia, said percentages being based on the weight of the solids of the latex, and then evaporating water from the latex until the latex is concentrated to a solids content of 55% to 70%.

9. The method of concentrating a synthetic rubber latex aqueous emulsion polymerizate of material selected from the group consisting of butadienes-1,3 and mixtures of butadienes-1,3 with up to 70% by weight of such mixtures of monoethylenic compounds which contain a $CH_2=C<$ group and are copolymerizable with butadienes-1,3 having a solids content of 20% to 50% which comprises adding to the latex 2% to 15% of ammonium bicarbonate and 0.03% to 1% of polyethylene polyamine selected from the group consisting of diethylene triamine, triethylene tetramine, tetraethylene pentamine, pentaethylene hexamine, hexaethylene heptamine, heptaethylene octamine and higher polyethylene polyamines from the still bottom from the distillation recovery of the lower polyethylene polyamines from the product of the reaction of ethylene dichloride and ammonia, said percentages being based on the weight of the solids of the latex, and then evaporating water from the latex until the latex is concentrated to a solids content of 55% to 70%.

10. The method of concentrating a synthetic rubber latex of a copolymer of butadiene-1,3 and styrene having a solids content of 20% to 50% which comprises adding to the latex 2% to 15% of a volatile electrolyte selected from the group consisting of ammonium and amine salts that can be volatilized from aqueous solution at temperatures up to 100° C. and 0.01% to 1% of polyethylene polyamine selected from the group consisting of diethylene triamine, triethylene tetramine, tetraethylene pentamine, pentaethylene hexamine, hexaethylene heptamine, heptaethylene octamine and higher polyethylene polyamines from the still bottom from the distillation recovery of the lower polyethylene polyamines from the product of the reaction of ethylene dichloride and ammonia, said percentages being based on the weight of the solids of the latex, and then evaporating water from the latex until the latex is concentrated to a solids content of 55% to 70%.

11. The method of concentrating a synthetic rubber latex of a copolymer of butadiene-1,3 and styrene having a solids content of 20% to 50% which comprises adding to the latex 2% to 15% of an ammonium salt of carbonic acid and 0.03% to 1% of polyethylene polyamine selected from the group consisting of diethylene triamine, triethylene tetramine, tetraethylene pentamine, pentaethylene hexamine, hexaethylene heptamine, heptaethylene octamine and higher polyethylene polyamines from the still bottom from the distillation recovery of the lower polyethylene polyamines from the product of the reaction of ethylene dichloride and ammonia, said percentages being based on the weight of the solids of the latex, and then evaporating water from the latex until the latex is concentrated to a solids content of 55% to 70%.

12. The method of concentrating a synthetic rubber latex of a copolymer of butadiene-1,3 and styrene having a solids content of 20% to 50% which comprises adding to the latex 2% to 15% of ammonium bicarbonate and 0.03% to 1% of polyethylene polyamine selected from the group consisting of diethylene triamine, triethylene tetramine, tetraethylene pentamine, pentaethylene hexamine, hexaethylene heptamine, heptaethylene octamine and higher polyethylene polyamines from the still bottom from the distillation recovery of the lower polyethylene polyamines from the product of the reaction of ethylene dichloride and ammonia, said percentages being based on the weight of the solids of the latex, and then evaporating water from the latex until the latex is concentrated to a solids content of 55% to 70%.

References Cited in the file of this patent

UNITED STATES PATENTS

| | | |
|---|---|---|
| 2,357,861 | Willson | Sept. 12, 1944 |
| 2,359,698 | Uhlig | Oct. 3, 1944 |
| 2,444,801 | Arundale | July 6, 1948 |
| 2,475,053 | Rumbold | July 5, 1949 |
| 2,839,483 | Howland | June 17, 1958 |

FOREIGN PATENTS

| | | |
|---|---|---|
| 726,466 | Great Britain | Mar. 16, 1955 |